(12) United States Patent
Moshrefi et al.

(10) Patent No.: US 9,252,897 B2
(45) Date of Patent: Feb. 2, 2016

(54) MULTI-FEED EVENT VIEWING

(75) Inventors: Afshin Moshrefi, Newburyport, MA (US); Rahul Khushoo, Waltham, MA (US); Hong Xiao, Acton, MA (US); Nader Gharachorloo, Ossining, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 526 days.

(21) Appl. No.: 12/943,112

(22) Filed: Nov. 10, 2010

(65) Prior Publication Data

US 2012/0113264 A1 May 10, 2012

(51) Int. Cl.
*H04N 7/18* (2006.01)
*H04H 20/38* (2008.01)
*H04H 60/65* (2008.01)
*H04N 21/2187* (2011.01)
*H04H 60/31* (2008.01)
*H04H 60/46* (2008.01)

(52) U.S. Cl.
CPC ............... *H04H 20/38* (2013.01); *H04H 60/65* (2013.01); *H04N 7/181* (2013.01); *H04H 60/31* (2013.01); *H04H 60/46* (2013.01)

(58) Field of Classification Search
CPC .......... H04N 21/2187; H04N 21/4532; H04N 21/4755; H04N 7/181; H04H 60/46; H04H 60/65
USPC ......................................................... 348/157
See application file for complete search history.

(56) References Cited

U.S. PATENT DOCUMENTS

| | | | | |
|---|---|---|---|---|
| 2005/0141542 A1* | 6/2005 | Handekyn | .......... | H04N 21/4383 370/437 |
| 2008/0178232 A1* | 7/2008 | Velusamy | .......... | H04N 5/23203 725/88 |
| 2009/0202227 A1* | 8/2009 | Jang | ...................... | G11B 27/105 386/249 |
| 2010/0077441 A1* | 3/2010 | Thomas | ................ | G06F 3/1415 725/133 |
| 2010/0188485 A1* | 7/2010 | Abrams | ................. | H04N 5/247 348/46 |
| 2010/0195974 A1* | 8/2010 | Zheng et al. | .................... | 386/68 |

* cited by examiner

*Primary Examiner* — Andy Rao
*Assistant Examiner* — Obafemi Sosanya

(57) ABSTRACT

A method may include receiving a number of video feeds from video capture devices located at an event venue. The number of video feeds may be dynamically analyzed to determine feed information associated with the number of video feeds. A request to view a multi-feed event may be received from a user device. At least some of the number of video feeds may be provided to the user device in response to the request. Feed information corresponding to the at least some of the number of video feeds may be provided based on the dynamically analyzing.

17 Claims, 10 Drawing Sheets

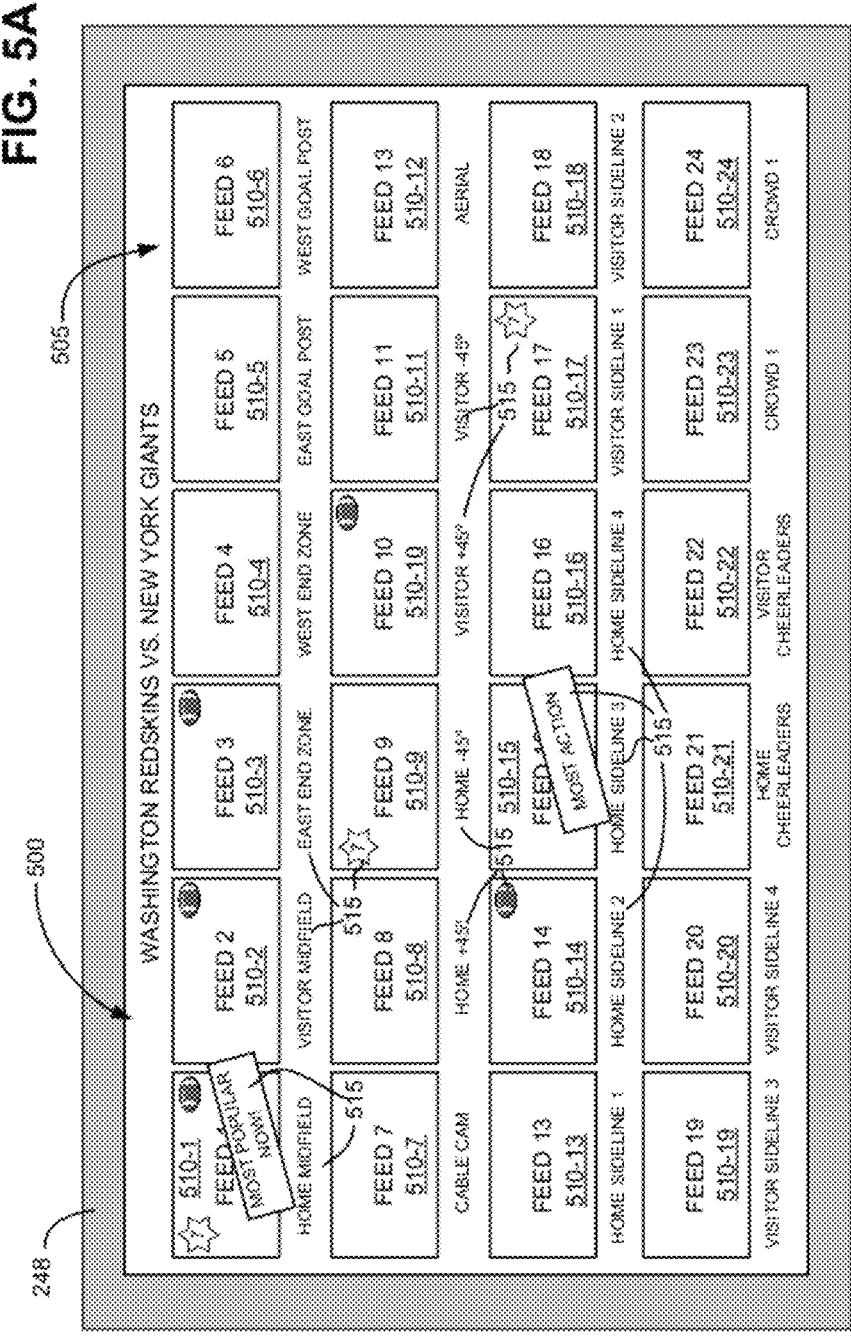

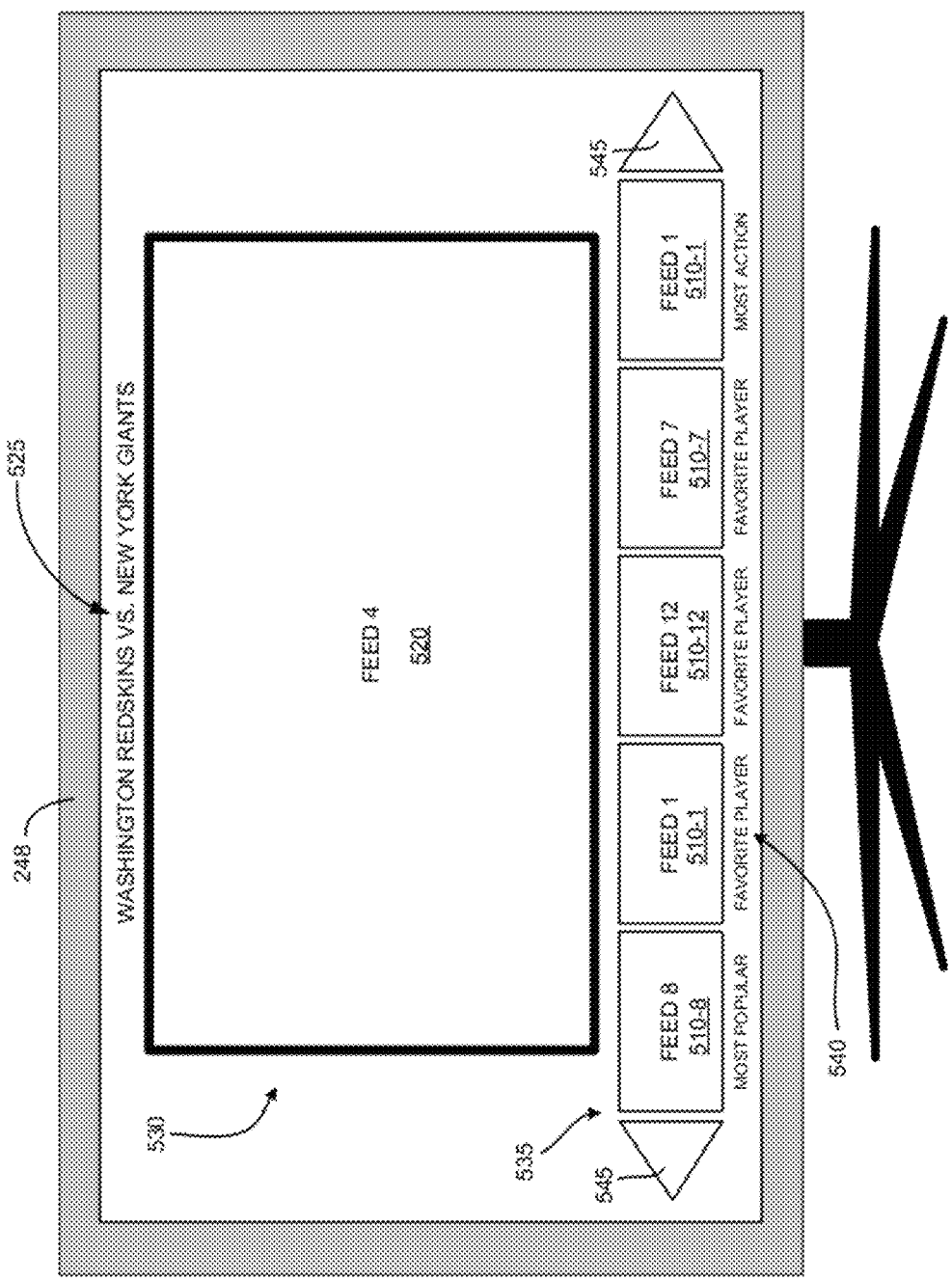

MULTI-FEED EVENT VIEWING

BACKGROUND INFORMATION

Historically, content customers typically only consumed professionally-produced media programs (e.g., network television programs, educational programs, etc.). These types of content and content consumption were popularized by large networks (e.g., NBC, CBS, and ABC) and the technology of the time (e.g., broadcast television and radio). Unfortunately, in many instances, even where the overall program content is desirable for viewing by users, the professionally produced content are not sufficiently tailored to the users' interests.

BRIEF DESCRIPTION OF THE DRAWINGS

FIGS. 5A-5D illustrate exemplary graphical user interfaces for providing multi-feed event viewing consistent with implementations described herein.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Implementations described herein relate to devices, methods, and systems for presenting, selecting, and viewing multi-feed content relating to a television event. Consistent with embodiments described herein, a number of concurrent feeds of the television event may be captured and presented to users via a unified interface. The television event may include a live television broadcast, a re-broadcast of the event, or other types of television programming. A user may then select a particular feed from among the number of concurrent feeds and the selected feed may be presented to the user in an enhanced or emphasized manner.

In addition to descriptive information for the concurrent feeds, such as view name/location, the feeds may be dynamically labeled or described using various social or situational criteria, such as most active, most popular, closest to the ball (e.g., in a football or soccer game), most players, etc. This dynamically descriptive information may be presented to the users along with or in addition to the concurrent feeds, thereby allowing the user to adaptively select the feed that is most interesting to them.

In some implementations, a user may record or otherwise capture the user's feed selections throughout the television event, effectively substituting the user's directorial judgment for a typical television event director's. The recorded version of the event may be shared with other users.

Figure 1:
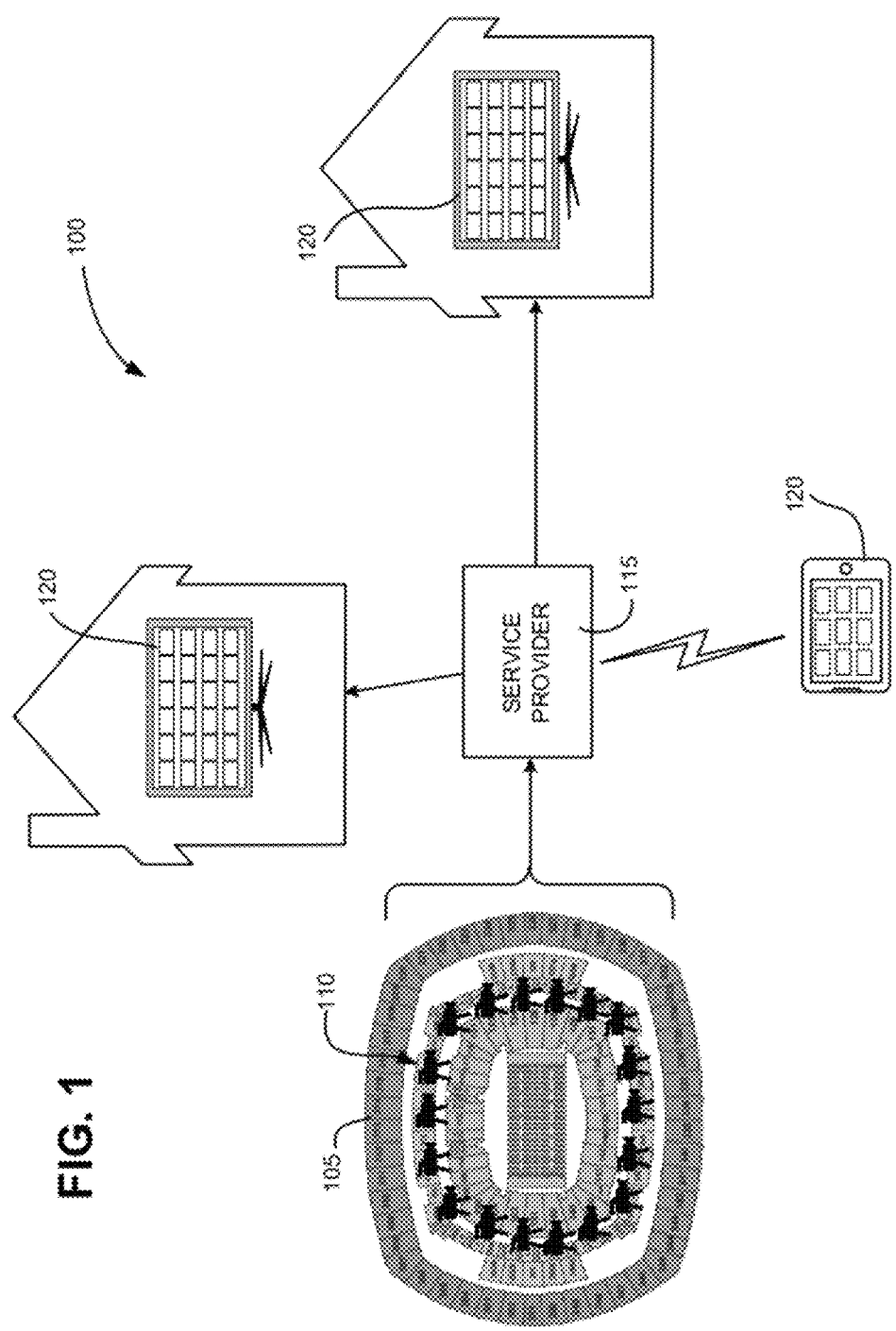
FIG. 1 is a diagram of an overview of an exemplary embodiment for providing multi-feed event viewing.

FIG. 1 is a block diagram depicting an overview 100 of the concepts described herein. As shown, a venue 105 may include a number of cameras or other information capture devices 110 positioned throughout venue 105 for capturing visual and/or audio-visual information associated with an event, such as a live athletic event. In some implementations, capture devices 110 may include a number of high definition (HD) television cameras. In some implementations, one or more of capture devices 110 may be configured to capture audio commentary associated with the live athletic event.

Capture devices 110 may generate feeds corresponding to the captured information. These feeds may be forwarded or transmitted to a service provider 115, such as a broadcaster, cable company, satellite television company, etc. For example, the feeds may be uplinked to a satellite via one or more mobile production units, transmitted via terrestrial cables, etc.

Service provider 115 may then reformat and retransmit the feeds to consumer devices 120. As depicted in FIG. 1, consumer devices 120 may include devices such as television, mobile communications devices, etc. The feeds may be distributed via a number of different distribution mechanisms, such as cable television systems, over the air (OTA) broadcast, fiber optic television systems, satellite television systems, etc. In some implementations, the feeds may be transmitted individually and combined at consumer devices 120, while in other implementations, the feeds may be combined at service provider 115.

Figure 2:
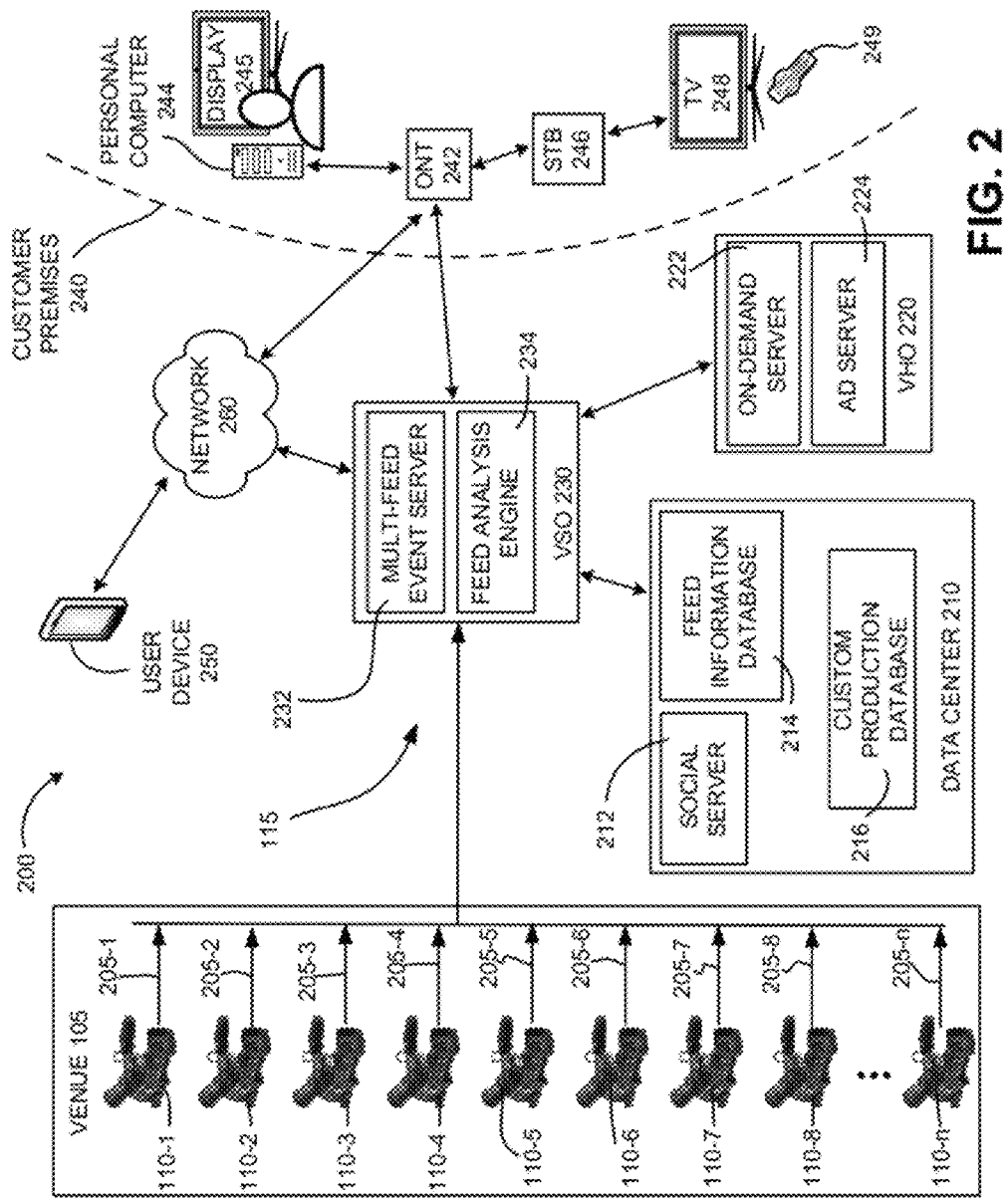
FIG. 2 is a diagram of an exemplary network 200 for implementing the embodiment of FIG. 1 and other embodiments.

FIG. 2 is a diagram of an exemplary network 200 for implementing the embodiment of FIG. 1 and other embodiments. Network 200 may include venue 105, video capture devices 110-1 to 110-n, a data center 210, a video hub office (VHO) 220, a video service office (VSO) 230, customer premises 240, user device 250, and a network 270.

As described briefly above, venue 105 may include any setting or location in which multiple video feeds of the same event or occurrence are being captured simultaneously by video capture devices 110. For example, venue 105 may include a sports stadium or arena, theater, movie/television set, newsroom, etc. Venue 105 may further include facilities for collecting and transmitting the video feeds from video capture devices 110 to VSO 230 for eventual distribution to customer premises 240 and/or user device 250. Such facilities may include mobile production units, broadcast/uplink facilities, radio frequency broadcast facilities, etc. In some implementations, the video feeds may be transmitted to VSO 230 via wireless network, such as a cellular data network (e.g., an EV-DO (EVolution-Data Optimized) network, LTE (Long Term Evolution), or HSDPA (High-Speed Downlink Packet Access) network). In other implementations, satellite-based transmission may be used to transmit broadcast quality video feeds from venue 105 to VSO 230.

Video capture devices 110 may include devices capable of capturing and transmitting a video feeds 205-1 to 205-n (collectively, "video feeds 205" and individually, "video feed 205"). Suitable video capture devices 110 may include television cameras, movie cameras, cell phone cameras, webcams, etc. Consistent with implementations described herein, individual video feeds 205 from each video capture device 110 may be transmitted in some manner to VSO 230 for distribution to end users in producing their own version of the captured event.

Customer premises 240 (e.g., a customer's home or business) may include an optical network terminal (ONT) 242, a personal computer 244, a set-top box (STB) 246, a television 248, and a remote control 249.

ONT 242 may receive data, e.g., on a fiber optic cable, and may transfer the data to the appropriate device in customer premises 240, such as computer 244 or STB 246. Likewise, ONT 242 may receive data from any device in customer premises 240 and may transmit the data to other devices in network 200, e.g., through a fiber optic cable. ONT 242 may provide customer premises 240 with Internet access, television access, or telephone service, for example.

Computer 244 may include a laptop, a desktop, a tablet computer, a mobile telephone, a personal digital assistant (PDA), or another computation and/or communication device. Computer 244 may include a microphone for capturing audio and/or a camera for capturing images or video. Computer 244 may also include a display 245 for showing images or video or a speaker for playing audio. Computer 244 may connect to network 260 (e.g., the Internet) through ONT 242 and VSO 230, for example.

STB 254 may receive content and output the content to TV 248 for display. STB 246 may include a component (e.g., a cable card or a software application) that interfaces with (e.g., plugs into) a host device (e.g., computer 244, TV 248, a stereo system, etc.) and allows the host device to display content. STB 246 may also be implemented as a home theater personal computer (HTPC), an optical disk player (e.g., digital video disk (DVD) or Blu-Ray™ disc player), etc. STB 246 may receive commands or data from other devices in network 200, such as remote control 249, and may transmit data to other devices in network 200 (e.g., to data center 210).

TV 248 may output content received from STB 246. TV 248 may include speakers as well as a display. Remote control 249 may issue wired or wireless commands for controlling other electronic devices, such as TV 248 or STB 246. Remote control 249, in conjunction with STB 246, may allow a user to interact with an application running on STB 246. Other types of devices (e.g., a keyboard, mouse, mobile phone, etc.) may be used instead of remote control 249. In one embodiment, TV 248 and/or STB 246 may be associated with a camera and a microphone for capturing user-generated clips or content, such as voice-over audio, etc.

As described below, STB 246 may be configured to receive information and/or data relating to video feeds 205 captured by video captured devices 110. In addition, STB 246 may receive information relating to video feeds 205 from data center 210. STB 246 may also receive, from the user, such as via remote control 249, for example, instructions to view a selected one of feeds 205. The information and instructions may be transmitted to VSO 230, resulting in display of the selected feed on TV 248.

User device 250 may include a mobile device, such as a mobile phone, a smart phone (e.g., a smart phone with a high definition display), a laptop or notebook computer, a personal computer, a tablet device, etc. configured to access VSO 230 via network 260. For example, user device 250 may be configured to access VSO 230 via the Internet, without initially passing though ONT 252 or customer premises devices. Devices in customer premises 240 (e.g., computer 244, STB, 246, and TV 248) may also be considered "user devices 250" for the purposes of this description.

Customer premises 240 and user device 250 may connect to VSO 230. VSO 230 may deliver content to customer premises 240 and may receive data from customer premises 240 for forwarding to the proper destination (e.g., data center 210). VSO 230 may include a content server for transcoding and multiplexing content from different sources for delivery to customer premises 240. More specifically, VSO 230 may include a multi-feed event server 232 for providing data and/or information relating to video feeds 205 to customer premises 240 and user device 250. As described below, multi-feed event server 232 may be configured to receive video feeds 205 from venue 105 and transmit the feeds 205 (or representations of feeds 205) to customer premises 240 and/or user device 250. In addition to the feeds themselves, multi-feed event server 232 may be configured to provide information relating to the content of the feeds and social or viewing information relating to the feeds. This information may be transmitted to and/or retrieved from data center 210. VSO 230, VHO 220, data center 210, and other devices in network 200 may form part of a high-speed fiber optic network (e.g., FiOS™). In one implementation, the high-speed fiber optic network may operate at per-premises speeds on the order of 1-10 gigabits per second (GiP). For example, multi-feed event server 232 in VSO 230 may multiplex advertisements or other information into content from data center 210, VHO 220, and/or venue 105.

Consistent with implementations described herein, VSO 230 may transmit video feeds 205 from video capture devices 110 (or a representation of the video feeds) to user devices 250. For example, an interactive channel may be provided to STB 246. In other implementations, STB 246 may be configured to include an event viewing application configured to receive the feed information from VSO 230. Upon selection of a particular feed 205 for viewing (e.g., on TV 248), VSO 230 may receive an indication of the selected feed from STB 246. Where VSO 230 has initially provided feed representations (e.g., down rezzed (lower resolution) versions of video feeds 205), VSO 230 may respond to the indication by providing a full version of the selected feed. Alternative, where VSO 230 has initially provided full versions of feeds 205, such transmission is not necessary. In either case, VSO 230 may transmit information regarding an identification of the user/customer and the selected feed to data center 210.

Feed analysis engine 234 may include a server or other processing device, configured to dynamically extract identifying information from video feeds 205. For example, feed analysis engine 234 may be configured to rank video feeds 205 based on the level of action in the feed, identify feeds 205 in which the ball is shown (e.g., for soccer, etc.) identify feeds 205 associated with particular event participants (e.g., players, actors, politicians, etc.), etc.

In some embodiments, video feeds 205 may be further identified by their physical position or location in venue 105. For example, when outputting feeds 205 for a football game, video feeds 205 may be denoted (e.g., in a mobile production unit associated with venue 105) by respective end zone names (e.g., north end zone, south end zone), goal post names, sideline name (e.g., east sideline 1, east sideline 2, west sideline 4, etc.), overhead camera name (e.g., cable suspended, blimp, etc.), etc. In some embodiments, such information describing locations or positions may be used as static identifiers associated with the each of the feeds from video capture devices 110. Feed/viewing heuristics engine 214 may store this description information in the feed information database.

In one exemplary implementation, feed analysis engine 234 may be configured to generate a virtual representation of an event based on the information included within video feeds 205. For example, feeds analysis engine 234 may be configured to identify players or other elements on a field or in a venue based on object recognition, facial recognition, or OCR techniques (e.g., recognizing numbers or names on uniforms, etc.). The location of a ball, players, etc. on the playing surface, for example, may be determined based on the known location of respective video capture devices 110, and the tracked locations of the players or objects with the various feeds, etc. This location information may be used to spatially position a virtual player icon or avatar within a virtual representation of the event, such as a two-dimensional or three-dimensional version of the event. Because this information is tracked and determined in substantially real time, the animated or virtual version of the event may be presented along with feeds 205. Upon user request, multi-feed event server 232 may present the virtual or animated version of the event to the user based on the analyzed video feeds 205.

Both the static and dynamically extracted feed related information may be transmitted to data center 210 and stored in a feed information database 214 that matches video feed identifiers with the information extracted from the feed, such as identifiers of participants/elements shown in the feed, an action ranking, etc.

More specifically, data center 210 may include one or more servers or other network devices (collectively, "network devices") that manage and/or store data associated with video feeds 205 received from video capture devices 110. As shown in FIG. 2, data center 210 may include a social server 212, feed information database 214, and a custom production database 216. Devices in data center 210 may include one or more computers for hosting programs, such as a web server (e.g., Apache), a database (e.g., MySQL), or other applications.

Social server 212 may include a database and/or server that receives and stores information about a number of users viewing one or more of video feeds 205 from video capture devices 110. For example, in a dynamic or continuously updated manner, social server 212 may receive information from VSO 230 relating to a video feed currently selected for viewing via STB 246. This information may be received for a number of viewers, possibly in the hundreds of thousands or millions. The collected information may be used to provide dynamic information regarding available video feeds to VSO 230, such as "most watched" over particular periods of time, highest rated, etc.

In addition, social server 212 may include social profiles associated with users, such as identification of other users connected to each particular user in various ways, such as through direct connections (e.g., friends, followers, etc.) or through indirect connections, based on, for example, geographic areas, school affiliations, favorite teams, or other demographic information. The social profiles may also include viewing preferences associated with users, such as favorite players, preferred views, favorite teams, etc. This information may be used to label or describe feeds 205 based on information associated with other connected users or user preference information, such as by identifying the feed most viewed by a users friends, identifying feeds showing favorite players, etc. Feed information database 314, as briefly described above, may be configured to store the feed information from VSO 230 and social server 212 for use by multi-feed event server 232.

Custom production database 216 may include a server or other device for receiving and storing user-generated versions of the event. For example, as will be described in detail below, upon request from a user, custom production database 216 may receive and store a version of the event that includes the video feeds as selected by the user, in the order and manner selected by the user. Accordingly, via custom production database 216, the user may create a custom version of a broadcast event for later viewing or sharing with friends and family.

In one implementation, custom production database 216 may be configured to receive, during viewing of the event by the user, a feed identification and start and end timestamps for each feed viewed during the event. Taken together, the provided information represents the user's entire viewing experience for the event. This information may be stored and associated with both the user and an event identifier for later retrieval and distribution/viewing. In some embodiments, custom production database 216 may be configured to receive audio information from the user, via a microphone or other device. The audio information may also include timestamp information for synchronizing the audio with the corresponding video during subsequent retrieval and display of the custom version of the event.

In some implementations, custom production database 216 or another component of data center 210 may store some or all of the content of video feeds 205 for shared use by custom production database 216. For example, feeds 205 for a particular event may be stored and associated with feed information database 214. References to particular stored feeds and start/end times for portions of those feeds may be used by custom production database 216 to regenerate or re-broadcast the user's custom production of the event.

VHO 220 may include an on-demand server 222 and an ad server 224. On-demand server 222 may provide on-demand content including programs identified in custom production database 216. On-demand server 222 may also include a catalog of programs (e.g., programs stored in custom production database 216) for a user to browse and select. For example, a user in customer premises 240 may select a shared custom production of an event through on-demand server 222 that is stored in custom production database 216. Ad server 224 may provide and/or manage the advertising content (e.g., commercials) that is presented with other content. In one embodiment, the owner of the custom production may share revenue generated by presenting ads in the custom production.

In addition to providing advertising content in custom production programs, ad server 224 may be configured to provide advertisements to user devices 250 during selection and display of video feeds 205. In one implementation, different advertisements may be inserted based on the particular video feed 205 being viewed, while in other implementations, a single advertisement may be displayed regardless of the feed 205 being viewed.

Network 260 may include one or more packet switched networks, such as an Internet protocol (IP) based network, a local area network (LAN), a wide area network (WAN), a personal area network (PAN), an intranet, the Internet, a cellular network (e.g., an EV-DO network, LTE network, or HSDPA network), a fiber-optic network, or another type of network that is capable of transmitting data. Network 260 may include a circuit-switched network, such as a public-switched telephone network (PSTN) for providing telephone services for traditional telephones. Network 260, in conjunction with components in VSO 230, may allow devices at customer premises 240 (e.g., a computer or a set-top box) to connect to other devices also attached to network 240, such as third party web-site servers (not shown) or other customers (not shown), or user device 250.

The exemplary configuration of devices in network 200 is illustrated for simplicity. Network 200 may include more devices, fewer devices, or a different configuration of devices than illustrated in FIG. 2. For example, network 200 may include thousands or millions of customer premises. As another example, network 200 may include a cable modem in a customer premises for receiving and transmitting data. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
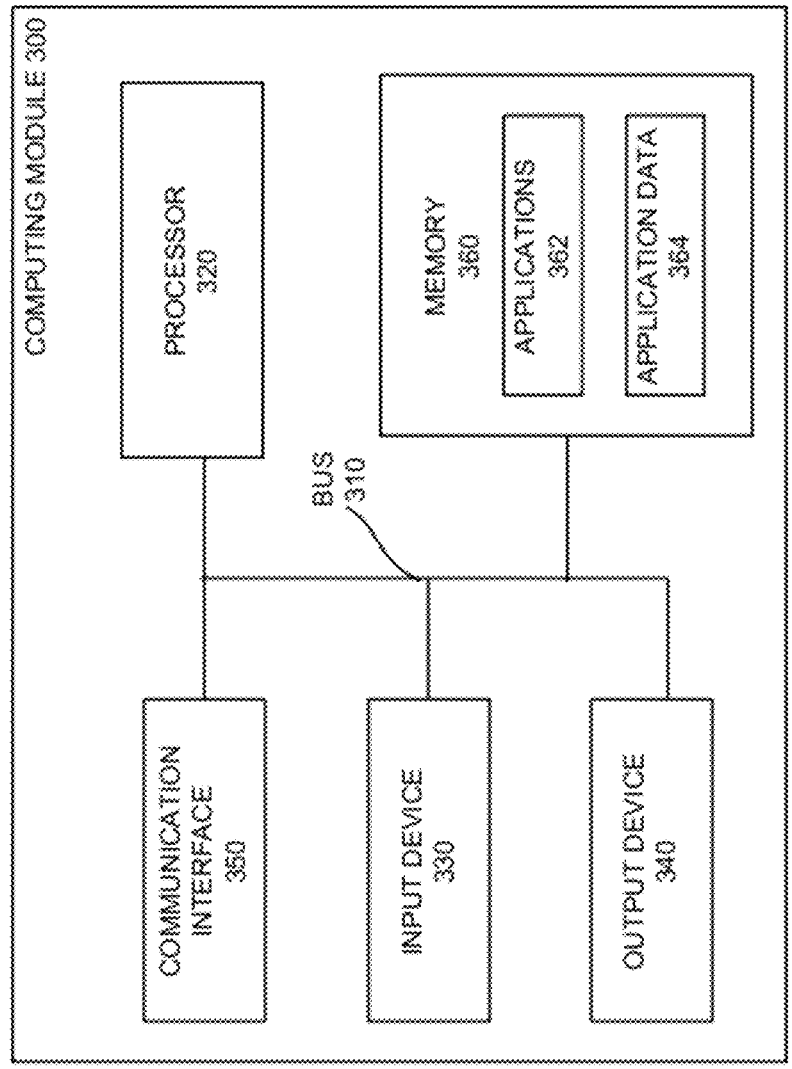
FIG. 3 is a block diagram of exemplary components of a computing module.

Devices in network 200 may each include one or more computing modules. FIG. 3 is a block diagram of exemplary components of a computing module 300. Computing module 300 may include a bus 310, processor 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processor 320 may include any type of processor or microprocessor (or families of processors or microprocessors) that interprets and executes instructions. In other embodiments, processor 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 249), an audio capture device, an image and/or video capture device, a touch-screen display, etc. Some devices, such as servers 212, 214, 216, 222, and 224 may be managed remotely and may not include input device 330. In other words, some devices may be "headless" and may not include a keyboard, for example.

Output device 340 may output information to the user. Output device 340 may include a display, a printer, a speaker, etc. For example, TV 248, personal computer 244, and/or display 245 include a display (an output device), which may include a liquid-crystal display (LCD) for displaying content to the user. As another example, ONT 242 and STB 246 may include light-emitting diodes (LEDs). Headless devices, such as servers 212, 214, 216, 222, and 224 may be managed remotely and may not include output device 340.

Input device 330 and output device 340 may allow a user to activate and interact with a particular service or application, such as an interactive event viewing application, an interactive program guide (IPG), a digital video recorder (DVR), a web browser, or a video editing program. Input device 330 and output device 340 may allow a user to receive and view a number of options or features and select from the options. The options or features may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 362) and data (e.g., application data 364) for use by processor 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive). Applications 362 and application data 364 may provide network services or include applications, depending on the device in which the particular computing module 300 is found.

Computing module 300 may perform the operations described herein in response to processor 320 executing software instructions contained in a computer-readable medium, such as memory 360. A computer-readable medium may include a physical or logical memory device. The software instructions may be read into memory 360 from another computer-readable medium or from another device via communication interface 350. The software instructions contained in memory 360 may cause processor 320 to perform processes that are described herein.

Figure 4A:
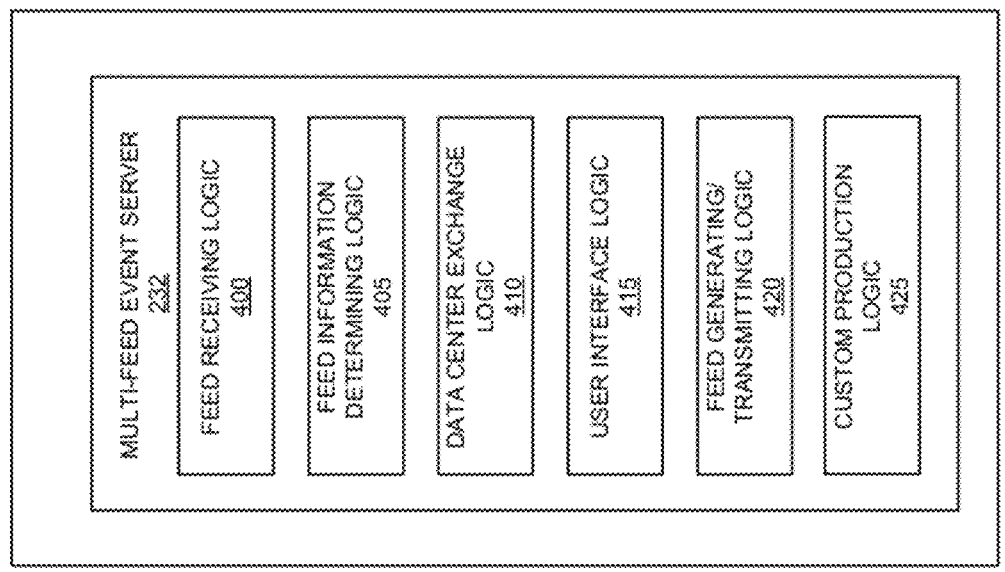
FIG. 4A is a block diagram of exemplary components of the of the multi-feed event server of FIG. 2.

As described above, VSO 230 may provide multi-feed event viewing services to a user. FIG. 4A is a block diagram of exemplary components of multi-feed event server 232 (e.g., functions performed by application 362 in processor 320 or stored in memory 360 of multi-feed event server 232). Multi-feed event server 232 may include feed receiving logic 400, feed information determining logic 405, data center exchange logic 410, user interface logic 415, and feed generating and transmitting logic 420, and custom production logic 425.

Feed receiving logic 400 may include logic configured to receive video feeds 205 from venue 105. For example, feed receiving logic 400 may include a receiver for decoding and/or demultiplexing feeds 205 from a satellite or other distribution medium.

Feed information determining logic 405 may include logic configured to identify information relating to video fees 205. For example, feed information determining logic 405 may be configured to extract or identify feed information included in feeds 205, such as feed/camera name, feed type, event name, etc.

In addition to static information included within video feeds 205, feed information determining logic 405 may also be identify dynamically changing information relating to video feeds 205. Exemplary content-related feed information may include an indication of the feed that shows the highest number of participants, the fewest number of participants, the ball, the most camera movement (e.g., action), or that shows particular players/participants. In some implementations, identification of particular players/participants may be performed by facial and/or optical character recognition dynamically performed on the participants.

Data center exchange logic 410 may include logic configured to transmit/receive feed information to/from data center 210. For example, data center exchange logic 410 may be configured to exchange video feed information from feed information database 214. As described above, information in feed information database 214 may include the feed information identified by feed analysis engine 234 and social information for the feeds, such as: an indication of the most popular feed within various periods of time (e.g., now, last 5 minutes, last 30 minutes, for entire event, etc.), an indication of the highest ranked feed, most popular feed among users associated with a current user, most popular feed for various geographic regions (e.g., state, city, town), etc.

User interface logic 415 may include logic configured to receive information relating to particular users interacting with multi-feed event server 232. For example, user interface logic 415 may receive an identification associated with STB 246, user login credentials, etc. User interface logic 415 may transmit this information to data center 210 for use by social server 212. In addition, user interface logic 415 may transmit multi-feed event system interface elements to customer premises 240 and user device 250. For example, user interface logic 415 may include a web server or application server for providing interface elements and one or more of video feeds 205 to user device 250 and/or customer premises 240. As described below, interface elements may include text elements, video elements, animations, menus, buttons, banners, etc.

User interface logic 415 may be configured to receive interactions from a user relating to selecting feeds, ranking feeds, recording a custom production, etc. Selected portions of this information may be transmitted to data center 210 for use in determining dynamic social feed information, as described above.

Feed generating and transmitting logic 420 may include logic configured to format and transmit one or more feeds 205 to customer premises 240 and/or user device 250. For example, generating and transmitting logic 420 may be configured to format, encode, compress, package one or more of video feeds 205 into signals for transmission to customer premises 240 and/or user device 250. In some implementations, the formatting and transmitting may include generating a single video feed that includes representations of one or more video feeds 205, such as thumbnail versions of the feed spaced into a matrix of grid. In other implementations, the formatting and transmitting may include encoding the video feeds into a scalable format for viewing in both a multi-feed selection interface and in a larger size upon selection of the feed.

Custom production logic 425 may include logic configured to receive, from customer premises 240 or user device 250, 1) an indication that a user has selected to record a custom production, and/or 2) a stored custom production. For example, in a first embodiment, custom production logic 425 may be configured to receive an indication that a user has selected to record a custom production from user interface logic 415. In response, custom production logic 425 may be configured to capture information regarding video feeds 205 selected by the user, the timing of the selections, and any other information relating to the custom production, such as custom audio information, etc. The captured information may be transmitted to custom production database 216 for subsequent retrieval of the custom production.

In another embodiment, a custom production may be stored at customer premises 240 or user device 250 (e.g., via STB 246). The stored custom production may be received by custom production logic 425 and forwarded to custom production database 216 for subsequent retrieval.

Figure 4B:
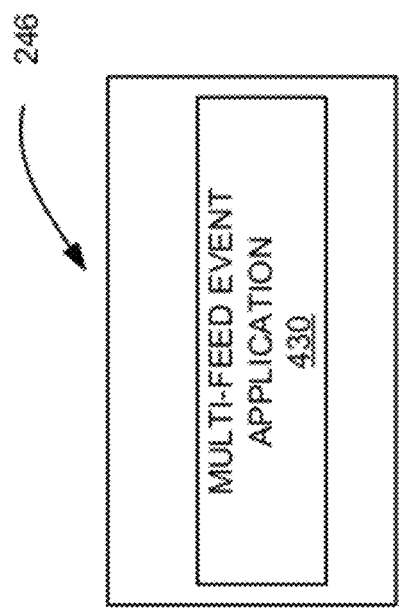
FIG. 4B is a block diagram of an exemplary component of the STB of FIG. 2.

As described above, STB 246 may allow a user to interact with multi-feed event server 232 to select and view one or more feeds selected from video feeds 205. FIG. 4B is a block diagram of an exemplary component of STB 246 (e.g., functions performed by application 362 in processor 320 or stored in memory 360 of STB 246). STB 426 may include a multi-feed event application 430. Computer 244, TV 248, and or user device 250 may be similarly configured and may also allow a user to interact with multi-feed event server 232 to select and view one or more feeds selected from video feeds 205.

Multi-feed event application 430 may include a combination of software and/or hardware components for receiving interface information from user interface logic 415 of VSO 230 and video feeds from feed generating and transmitting logic 420. More specifically, multi-feed event application 430 may be configured to present the one or more video feeds 205 and related information in a variety of manners, based on (at least in part) selections and options received from the user. For example, multi-feed event application 430 may be configured to, upon activation or execution on STB 246 (e.g., upon selection from a number of available applications or viewing options), present a graphical user interface (GUI) for display via TV 248. The GUI may include representations of a number of the video feeds 205 available for selection by the user.

FIG. 5A illustrates one exemplary implementation of such an interface. As shown, FIG. 5A illustrates a GUI 500 that includes a matrix 505 of feed elements 510-1 to 510-24 (collectively "feed elements 510") and individually "feed element 510") that correspond to respective ones of available feeds 205. Although matrix 505 in GUI 500 includes feed elements 510 for 24 available feeds 205, matrix 505 may be configured to provide more or fewer feed elements 510. As described above, in some implementations, feeds elements 510 presented via GUI 500 may be full resolution versions of feeds 205 received by VSO 230 from venue 230, while in other implementations, feed elements 510 may be provided as part of a single interactive video feed from VSO 230.

In addition to feed elements 510, GUI 500 may include a number of descriptive elements 515 (collectively "descriptive elements 515" and individually "descriptive element 515") corresponding to feed elements 510 and received from feed information database 214, for example. As shown in FIG. 5A, descriptive elements 515 may include textual descriptions corresponding to feeds 205, such as static feed information (e.g., feed name, camera location), and dynamic feed information (e.g., most popular feed, showing a favorite player, most action, particular friend viewing, etc.). As described above, information for each feed 205 may be extracted or identified from feeds 205 by feed analysis engine 232 in VSO 230. This information may be stored in feed information database 214 and used to populate descriptive elements 515 associated with feed elements 510.

In addition to textual descriptions, descriptive elements 515 may also include non-text elements, such as icons, colors, borders, etc. Such non-text elements may be used to identify attributes or features of particular feeds. For example, in GUI 500, a football icon element 515 may be used to graphically indicate feeds 205 that currently show the ball in a football game. Similarly, a star icon with a number in it may be used to represent feeds 205 that currently show a user's favorite player with the player number.

Figure 5B:
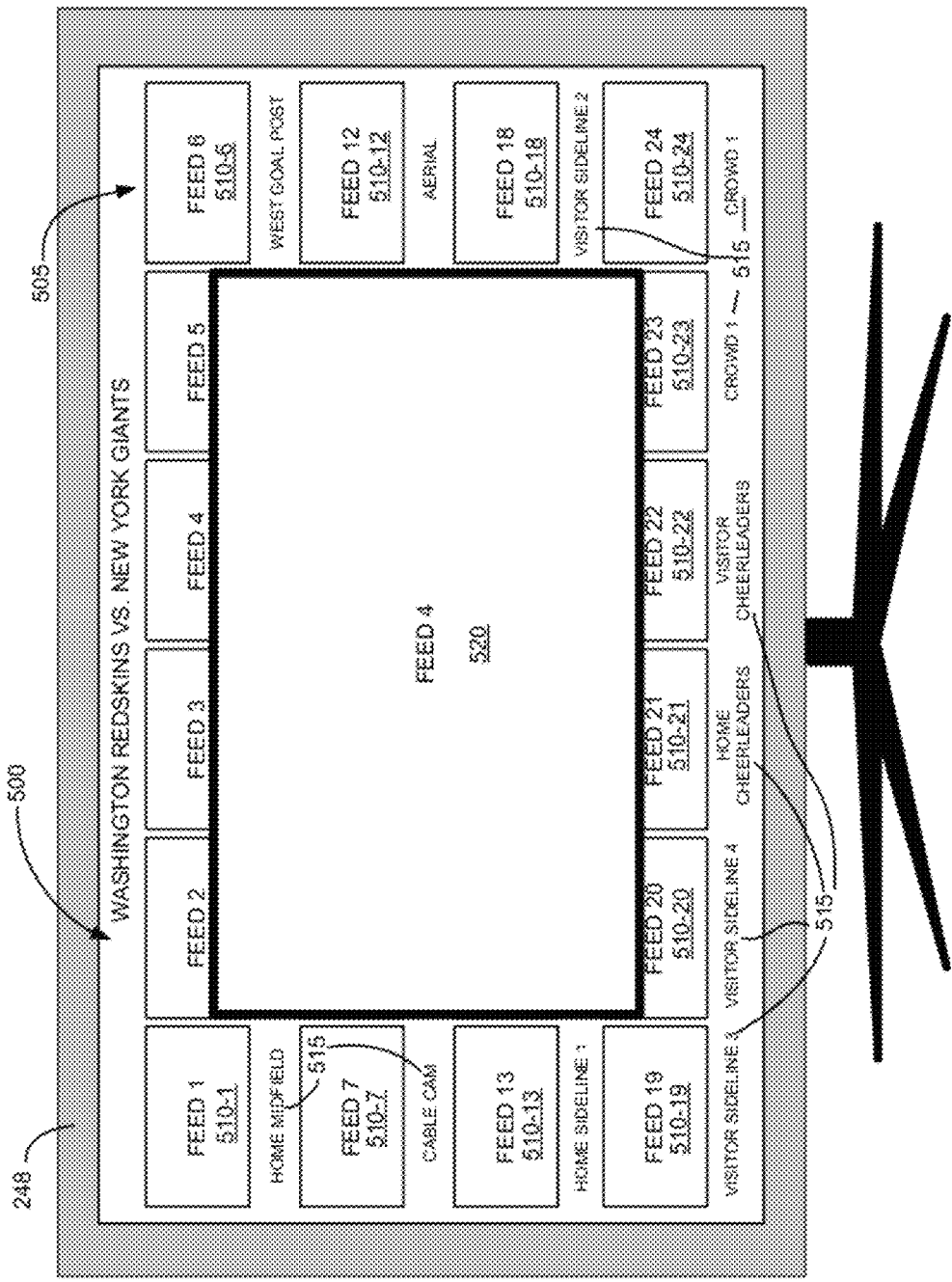

Consistent with implementations described herein, GUI 500 may facilitate user interaction and selection of a particular feed element 510 from matrix 505. For example, the user may navigate GUI 500 using remote 249. FIG. 5B illustrates GUI 500 following user selection of a particular feed element 510-4 from matrix 505. As shown, upon selection of feed element 510-4, an expanded and/or full screen version 520 corresponding to video feed 205-4.

In some implementations, selection of a particular feed element 510 may cause VSO 230 to transmit a different version of the corresponding feed 205 to STB 246. This different (e.g., larger) version of the particular feed 205 may be received by multi-feed event application 430 and used to generate version 520 in GUI 500. In other implementations, selection of a particular feed element 510 may cause multi-feed event application 430 to transcode (e.g., rescale) feed element 205 to version 520.

FIG. 5C illustrates a GUI 525 presented by multi-feed event application 430 upon selection of a particular feed element 510 in GUI 500. As shown, GUI 525 may include a selected feed portion 530 and an available feeds navigation section 535. Selected feed portion 530 may include correspond to a particular video feed 205 and may include a larger display window. Available feeds navigation section 535 may include a strip-like listing 540 that includes a number of feed elements 510 corresponding to a number of available feeds. The feed elements 510 included in listing 540 may be selected using a number of factors, such as most viewed, highest action, showing favorite players (as stored in the user's profile on social server 212), etc. Available feeds navigation section 535 may include navigation elements 545 on either end of listing 540. Selection of either navigation element 545 may cause listing 540 to scroll to show different feed elements 510.

Consistent with implementations described herein, multi-feed event application 430 may be configured to provide an animated or virtual representation of the event. As described above, multi-feed event server 232 may be configured to generate a virtual representation of the event based on information obtained by feed analysis engine 234, such as locations of participants and other objects on a playing surface, etc. Upon receipt of a user request, e.g., by selection of a button or icon (not shown) on GUI 500, multi-feed event application 430 may request and receive the virtual representation of the event from multi-feed event server 232.

Figure 5D:
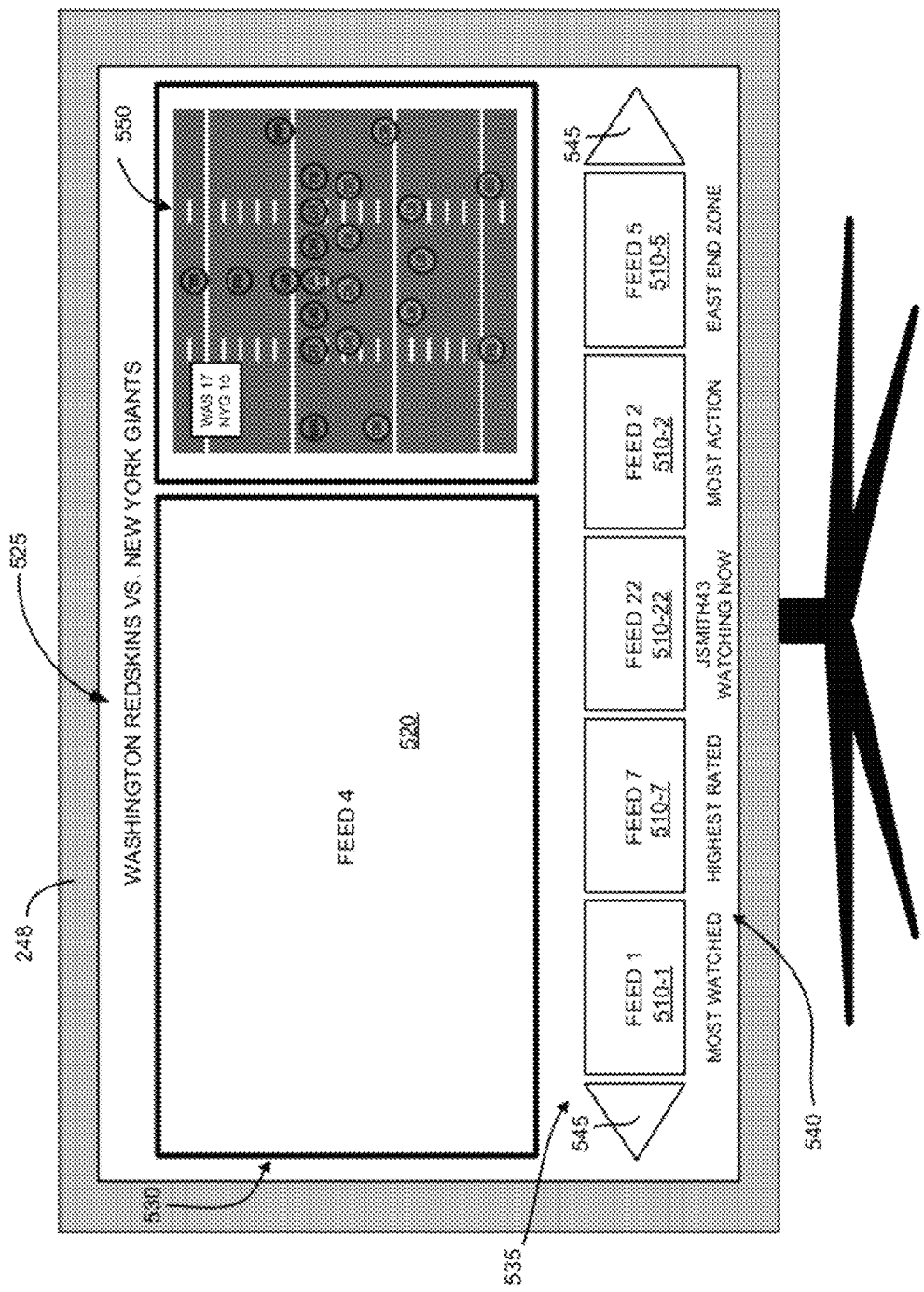

FIG. 5D illustrates exemplary GUI 525 including a virtual representation 550 of the event. As shown, in one implementation, virtual representation 550 may include a two-dimensional animated representation of the playing surface or sporting event. Virtual representation 530 may include icons or avatars associated with the players on the field, the ball, etc. As described above, using the dynamically determined information about the event generated by feed analysis engine 234, multi-feed application 430 may continuously update virtual representation 530 to accurately reflect the location and movement of players and objects on the field.

Figure 6:
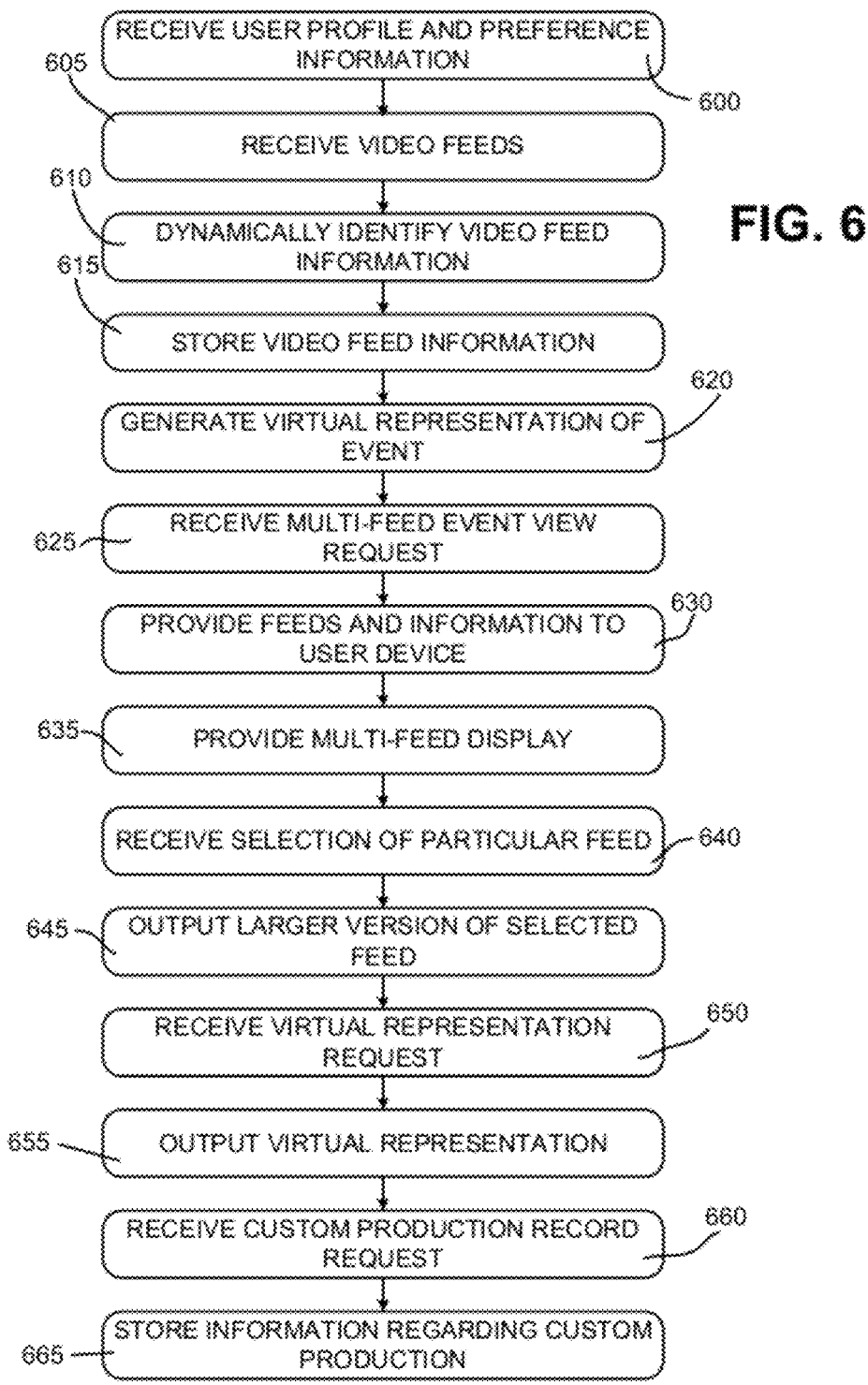
FIG. 6 is a flow diagram illustrating exemplary processing associated with providing a multi-feed event viewing experience to a user.

FIG. 6 is a flow diagram illustrating exemplary processing associated with providing a multi-feed event viewing experience to a user. Processing may begin with VSO 230 receiving user profile and preference information (block 600). For example, multi-feed event server 232 may receive user viewing preferences and social network information, such indications of friends or connections, address information, favorite players or teams, favorite views, etc. As described above, this information may be stored on social server 212 in data center 210.

VSO 230 may receive a number of video feeds for an event (block 605). For example, multi-feed event server 232 may receive feeds 205 from venue 105. In some implementations, feeds 205 may be transmitted from a mobile production unit or other production equipment located proximate to venue 105 via a satellite uplink or other professional production infrastructure. In other implementations, feeds 205 may be transmitted by mobile devices, such as cell phones, web cams, etc. via terrestrial wireless networks (e.g., cellular data networks).

VSO 230 may dynamically identify feed information corresponding to the received video feeds 205 (block 610). For example, feed analysis engine 234 may extract information from each feed 205 corresponding to its location/position in venue 105, the type of view provided, feed name, event name, venue name, etc. In addition, feed analysis engine 234 may determine dynamic information associated with each feed 205, such as identities of players viewed within a feed, action rankings for the feeds (based on, for example, content movement with the feed, etc.), whether the feed shows the ball, numbers of players visible in each feed, etc.

Feed analysis engine 234 may also determine social and or/user preference related information associated with each feed 205. For example, feed analysis engine 234 may determine, based on information maintained by social server 212, what users are currently watching each feed 205, which feeds 205 are the most popular (e.g., most watched) over varying lengths of time (5 minutes, 10 minutes, 30 minutes, etc.), which feeds are highest rated, etc.

The determined feed information may be stored in data center 210 (block 615). For example, feed analysis engine 230 may store determined information relating to feeds 205 in feed information database 214. As described above, the contents of feed information database 214 may be continually updated to reflect accurate information for a particular feed at a current point in time. In some implementations, feed information database 214 may be configured to store changes over the duration of the event for use in identifying particular views in feeds 205 following the conclusion of the event. For example, by storing an indication of each time that a particular player is shown in a particular feed, the movement of the player may be tracked throughout the event.

In some implementations, a virtual representation of the event may be generated (block 620). For example, as described above, multi-feed event server 232 may be configured to generate a virtual representation of the event based on information obtained by feed analysis engine 234, such as identified/recognized locations of participants and other objects on a playing surface, etc.

VSO 230 may receive a user request to view a multi-feed event (block 625). For example, multi-feed event server 232 may receive a request for the multi-feed event from multi-feed event application 430. In response, VSO 230 may provide a number of video feeds and/or feed representations and corresponding feed information to multi-feed event application 430 on user device 250 (block 630). For example, multi-feed event server 232 may provide representations (or full versions) of a number of available feeds 205 to multi-feed event application 430 along with at least some of the information determined by feed analysis engine 234.

Consistent with implementations described herein, the feed information provided to multi-feed event application 430 may be based at least in part on the user profile and/or preferences information received in block 600. For example, in response to the request from multi-feed event application 430, multi-feed event server 232 may look up the user profile and preferences information in social server 212 and retrieve corresponding feed information from feed information database 214. This information may be forwarded to multi-feed event application 430 for use in providing GUI 500 and descriptive elements 515.

By way of example, assume that the user profile and preference information associated with a particular STB 246 indicates that Mike Wallace, #17 on the Pittsburgh Steelers is a favorite player. Upon receiving a request to view a multi-feed event, multi-feed event server 232 may be configured to determine whether the event includes the Pittsburgh Steelers and whether the venue 105 is Heinz Field in Pittsburgh. If the event includes the Pittsburgh Steelers and the venue is Heinz Field, multi-feed event server 232 may be configured to identify feeds that include #17 in a black jersey, or that include a player wearing the name Wallace in a black jersey. If the event includes the Pittsburgh Steelers and the venue is not Heinz Field, multi-feed event server 232 may be configured to identify feeds that include #17 or the name Wallace in a white jersey. Information indicative of any identified feeds may be provided to multi-feed event application 430 for display to the user. By leveraging multi-feed availability with intelligent analysis of feed content, users are better able to view the exact content that they wish to see.

Multi-feed event application 430 may provide a multi-feed display to the user (block 635). For example, multi-feed event application 430 may generate and output GUI 500 that includes matrix 505 of feed elements 510. In addition, as described above, multi-feed event application 430 may be configured to provide relevant feed information received from VSO 230. For example, multi-feed event application 430 may provide indications of feed popularity, favorite players, action rating, numbers of players, etc. In other implementations, static feed information may also be provided, such as camera location, view type, etc.

Consistent with implementations described herein, multi-feed event application 430 may provide searching, sorting, and ranking functionalities. For example, multi-feed event application 430 may provide an interface for enabling users to locate particular players, particular types of feeds (e.g., least popular feed), etc. Such functionality may be particularly useful when the number of available feeds 205 is larger than the number of feed representations 505 in a display window. Upon receipt of search parameters (e.g., a query) from the user, multi-feed event application 430 may transmit the information to multi-feed event server 232 for a response based on information contained within feed information database 216.

Multi-feed event application 430 may receive a selection of a particular feed for viewing (block 640). In response multi-feed event application 430 may output a larger or full-screen version of the selected feed (block 645). As described above, in some implementations, the multi-feed view provided from VSO 230 to STB 246 includes a number of scalable video feeds. In such an implementation, outputting the larger or full-screen version of the selected feed may include scaling the selected feed to from the lower resolution, multi-feed view, to a higher resolution view. In other implementations, the multi-feed view provided from VSO 230 to STB 246 includes a single video feed that includes a number of lower-resolution versions of feeds 205. In this implementation, outputting the larger or full-screen version of the selected feed may include requesting and receiving the higher resolution feed from VSO 232.

Multi-feed event application 430 may receive a request to view the virtual representation of the event (block 650). For example, multi-feed event application 430 may receive a selection of an icon or menu item relating to the virtual representation. Upon receipt of the request, multi-feed event application 430 may request and receive the virtual representation of the event (generated in block 615) from multi-feed event server 232. Multi-feed event application 430 may output the virtual representation of the event (block 655). For example, multi-feed event application 430 may generate GUI 525 of FIG. 5D that includes the virtual representation 550.

Multi-feed event application 430 may receive a request to record a custom user production of the multi-feed event (block 660). In response, multi-feed event application 430 may store information relating to the particular video feeds selected for viewing, the durations that the feeds were viewed, and other information relating to the feeds (block 665).

As described above, in some implementations, users may record their custom version of the multi-feed event for subsequent viewing or sharing with others. The custom productions may include the feeds selected by the user in the selected order and for the selected durations. In some embodiments, users may add custom audio to the custom production, such as their own play-by-play or commentary. Recording or storing of the custom productions may be facilitated either at STB 246 of VSO 230. For example, in a local STB implementation, user selected feeds may be stored on a DVR component of STB 246 in a linear, chronological manner, such that the recording is continual with the user viewing.

In a cloud-based or VSO 230 implementation, storing of custom productions may be facilitated by storing (e.g., in custom production database 216) information relating to timings of the selections of particular feeds, such as start times, stop times, etc. The feeds themselves may be stored in data center 210 for later retrieval or integration into the custom production. Furthermore, this implementation allows for subsequent editing of a custom production to change the order/timing of feed views.

Implementations described herein relate to devices, methods, and systems for facilitating the custom viewing of an event using multiple video feeds. In some implementations, a number of video feeds of an event may be analyzed for content and other descriptive information. The information may include information relating to participants, overall view popularity, action rankings, social network popularity, etc. Upon request, a user may be provided with a matrix of available video feeds that include at least some of the determined information. In some instances, the provided information may be based on user preference or profile information indicative of the types of information the user is interested in (such as favorite players, etc.). The user may then select particular views for viewing based on the provided information. In some implementations, the user may record or store a custom production of the event for later viewing or sharing with other users.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a VSO 230 performing feed analysis for multiple video feeds and an STB 246 outputting a multi-feed event GUI. However, in other implementations, features described herein may be implemented in other devices.

Further, while series of blocks have been described with respect to FIG. 6, the order of the acts associated with the blocks may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving a number of video feeds from video capture devices located at an event venue;
   receiving user profile information relating to preferences associated with the user of the user device,
      wherein the user profile information includes at least one of: a listing of friends associated with the user, or one or more particular events participants;
   dynamically analyzing the number of video feeds based on the user profile information to determine feed information associated with the number of video feeds, wherein the dynamically analyzing the number of video feeds comprises:
      determining numbers of users viewing each of the number of video feeds; and
      determining a popularity of each of the number of video feeds based on the numbers of users viewing each of the number of video feeds;
   receiving, from a user device, a request to view a multi-feed event;
   receiving, from the user device, an indication of a manner of ranking the number of video feeds, wherein receiving the indication includes receiving an indication that the number of video feeds are to be ranked based on at least one of the popularity of each of the number of video feeds or a level of action associated with each of the number of video feeds;
   determining a ranking for the number of video feeds based on the received indication of the manner of ranking the number of video feeds;
   providing two or more of the number of video feeds to the user device based on the ranking and in response to the request; and
   providing, to the user device, feed information corresponding to the two or more of the number of video feeds based on the dynamically analyzing for use in selecting, by a user of the user device, a particular video feed from the provided two or more of the number of video feeds,
   wherein, when the user profile information includes the one or more particular event participants, the dynamically analyzing the number of video feeds further comprises identifying video feeds that include the one or more particular event participants; and
   providing, to the user device, an indication of video feeds that include the one or more particular event participants.

2. The computer-implemented method of claim 1, wherein providing feed information corresponding to the two or more of the number of video feeds further comprises:
   providing, to the user device, an indication of the popularity of each of the number of video feeds.

3. The computer-implemented method of claim 1, wherein the one or more particular event participants comprise one or more favorite players.

4. The computer-implemented method of claim 1, wherein, when the user profile information includes the listing of friends associated with the user, the dynamically analyzing the number of video feeds comprises determining friends currently viewing the video feeds; and
   providing, to the user device, an indication of the friends currently viewing each of the number of video feeds.

5. The computer-implemented method of claim 1, wherein providing the two or more of the number of video feeds to the user device in response to the request further comprises:
   formatting the two or more of the number of video feeds into a single video feed that includes representations of the two or more of the number of video feeds; and
   providing the single video feed to the user device.

6. The computer-implemented method of claim 5, further comprising:
   receiving a user selection of the particular video feed; and
   providing the particular video feed to the user device in response to the user selection.

7. The computer-implemented method of claim 1, wherein providing the two or more of the number of video feeds to the user device in response to the request further comprises:
   simultaneously providing scalable versions of the two or more of the number of video feeds to the user device.

8. A system comprising:
   a service provider device; and
   a user device connected to the service provider device via a network,
   wherein the service provider device is configured to:
      receive a number of video feeds from video capture devices located at an event venue;
      receive user profile information relating to preferences associated with the user of the user device,
         wherein the user profile information includes at least one of: a listing of friends associated with the user, or one or more particular event participants;
      dynamically analyze the number of video feeds based on the user profile information to determine feed information associated with the number of video feeds, wherein, to dynamically analyze the number of video feeds to determine the feed information, the service provider device is further configured to:
         determine numbers of users viewing each of the number of video feeds; and
         determine a popularity of each of the video feeds based on the numbers of users viewing each of the number of video feeds;
      receive, from the user device, a request to view a multi-feed event;
      receive, from the user device, an indication of a manner of ranking the number of video feeds, wherein, when receiving the indication, the service provider device is configured to receive an indication that the number of video feeds are to be ranked based on at least one of the popularity of each of the video feeds or a level of action associated with each of the number of video feeds;
      determine a ranking for the number of video feeds based on the manner of ranking the number of video feeds;
      provide the number of video feeds to the user device based on the ranking and in response to the request; and
      provide feed information corresponding to the number of video feeds based on the dynamically analyzing, wherein the feed information comprises at least the popularity of each of the number of video feeds, wherein, when the user profile information includes the one or more particular event participants, the service provider device to dynamically analyze the number of video feeds is further configured to:
- identify video feeds that include the one or more particular event participants; and
- provide, to the user device, an indication of video feeds that include the one or more particular event participants;

wherein the user device is configured to:
- receive the number of video feeds;
- output a graphical user interface for displaying the number of video feeds and the feed information corresponding to the number of video feeds;
- receive a user request to view a selected video feed from among the number of video feeds; and
- output the selected video feed.

9. The system of claim 8,
wherein the service provider device is further configured to:
- receive information designating the one or more particular event participants from the user device; and wherein the user device is further configured to display the indication of the determined presence of the one or more particular event participants in each of the video feeds in the graphical user interface.

10. The system of claim 9,
wherein the user device is further configured to:
- receive the information designating the one or more particular event participants as a request for video feeds that include one of the one or more particular event participants from the user.

11. The system of claim 8, wherein the user device is further configured to:
- receive a request to record a custom production of the event; and
- store information regarding the custom production based on the selected video feed.

12. The system of claim 11, wherein the information regarding the custom production based on the selected video feed comprises portions of the number of video feeds selected by the user.

13. The system of claim 11, wherein the information regarding the custom production based on the selected video feed comprises timing information regarding portions of the number of video feeds selected by the user, wherein the timing information comprises start and stop times for the portions of the number of video feeds selected by the user.

14. The system of claim 8, wherein the video capture devices located at an event venue comprise television cameras and the event venue comprises a sports stadium.

15. The system of claim 8, wherein the video capture devices located at an event venue comprise mobile user devices.

16. A non-transitory computer-readable medium having stored thereon sequences of instructions which, when executed by at least one processor, cause the at least one processor to:
- receive video feeds from video capture devices located at an event venue;
- receive user profile information relating to preferences associated with a user of the user device,
  wherein the user profile information includes at least one of: a listing of friends associated with the user, one or more particular event participants, or one or more favorite views;
- dynamically analyze the video feeds based on the user profile information to determine descriptive feed information associated with the video feeds,
  wherein the descriptive feed information associated with the video feeds comprises: popularity information, or action ranking information;
- receive, from a user device, a request to view a multi-feed event;
- receive, from the user device, an indication of a manner of ranking the video feeds, wherein the manner of ranking the video feeds includes at least one of ranking the video feeds based on the popularity information or ranking the video feeds based on the action ranking information;
- determine a ranking for the video feeds based on the manner of ranking the number of video feeds;
- provide the video feeds and the corresponding descriptive feed information to the user device based on the ranking and in response to the request;
- receive, from the user device, a request for a particular video feed;
- provide the particular video feed to the user device,
  wherein, when the user profile information includes the one or more favorite players, the instructions which, when executed by at least one processor, cause the at least one processor to dynamically analyze the number of video feeds further cause the at least one processor to:
  - identify video feeds that include the one or more particular event participants; and
  - provide, to the user device, an indication of video feeds that include the one or more particular event participants.

17. The non-transitory computer-readable medium of claim 16,
wherein the one or more particular event participants comprise one or more favorite players.

* * * * *